AUTOMATIC MAINTENANCE ARRANGEMENT FOR DATA PROCESSING SYSTEMS

Filed Nov. 27, 1964 6 Sheets-Sheet 1

INVENTORS M. E. ALTERMAN
D. W. HUFFMAN
F. S. VIGLIANTE
BY R. C. Winter
ATTORNEY

AUTOMATIC MAINTENANCE ARRANGEMENT FOR DATA PROCESSING SYSTEMS

United States Patent Office 3,409,877
Patented Nov. 5, 1968

3,409,877
AUTOMATIC MAINTENANCE ARRANGEMENT FOR DATA PROCESSING SYSTEMS

Michael E. Alterman, Matawan Township, Monmouth County, Donald W. Huffman, Shrewsbury, and Frank S. Vigliante, Piscataway Township, Middlesex County, N.J., assignors to Bell Telephone Laboratories, Incorporated, New York, N.Y., a corporation of New York Filed Nov. 27, 1964, Ser. No. 414,365
13 Claims. (Cl. 340—172.5)

ABSTRACT OF THE DISCLOSURE

A stored program controlled data processing system is disclosed in which components are duplicated to provide an active "on-line" unit and a standby "off-line" unit. A maintenance program contained in the active program store tests the active and standby units simultaneously and serves to interchange active and standby components upon detection of a fault in the active unit coupled with the absence of a fault in the standby unit.

Figure 1:
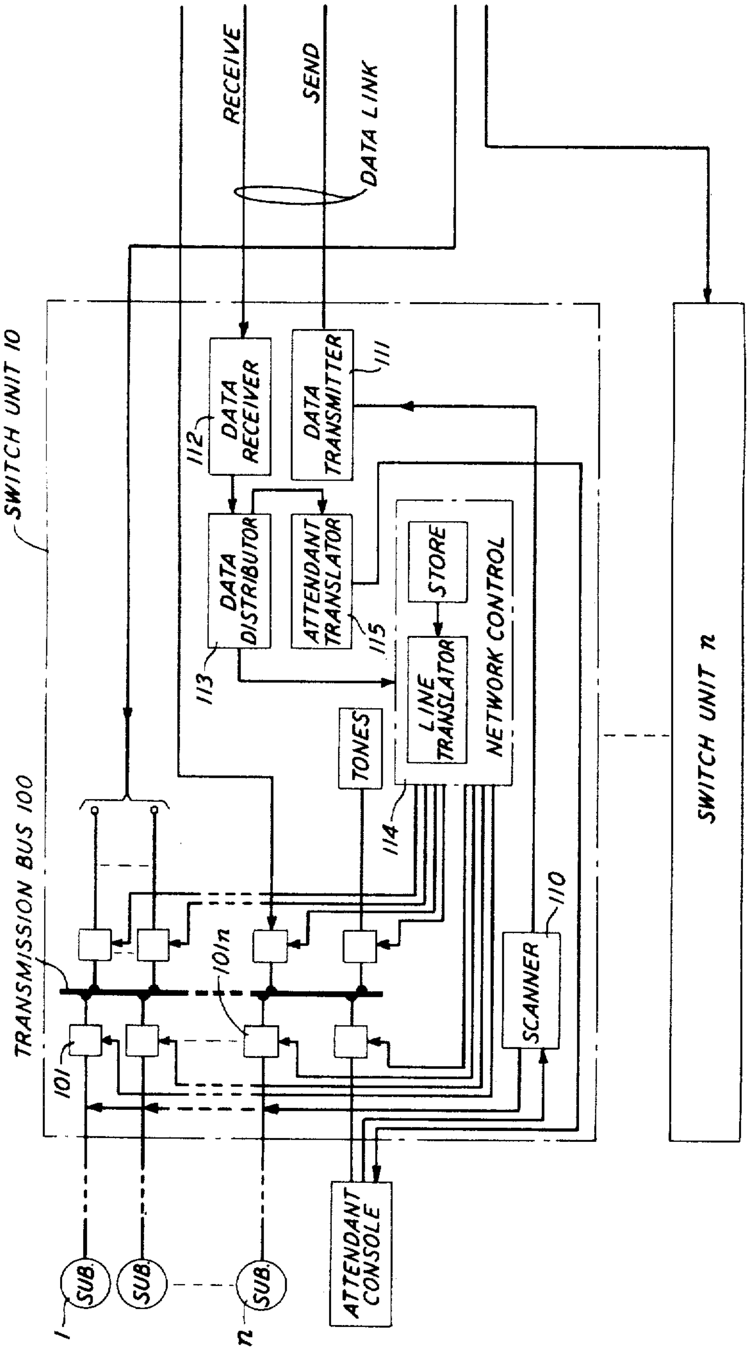

This invention relates to security arrangements in data processing systems and more particularly to facilities for providing and maintaining reliable operation of an electronic telephone system employing stored program techniques.

The high speed capabilities of currently available electronic devices are utilized to maximum advantage in telephone systems employing a common control facility. Such facilities may be controlled by a stored program consisting of various commands, instructions and routines for directing system operations in order to satisfy every conceivable system requirement. Periodically the stored program interrogates a temporary memory unit which maintains a record of the current status of calls through the system. Each call requiring performance of some control activity results in the retrieval from the temporary memory of an address of a discrete location in the stored program. The proper sequence of commands to satisfy the specific requirement is obtained from this discrete location and executed by components performing various functions throughout the system.

The problem of assuring reliable operation in such systems grows in stature with the size, speed and complexity of the particular system under consideration. This problem, of course, is not unique to electronic telephone systems but is encountered in data processing systems, computers and the like. The problem is further aggravated by the need for continuous service to the customer, thus demanding detection and correction of circuit troubles and device failures while the system continues in active service.

It is an object of this invetnion to improve the reliability of communication systems utilizing stored program techniques.

It is another object of this invention to assure continuous, reliable performance of an electronic telephone system.

These and other objects of this invetnion are attained in one specific illustrative embodiment incorporated in a telephone system having a plurality of isolated switch units each terminating a plurality of telephones and in which the control functions are performed in a common control center remote from the switch units. A system of this type is disclosed, for example, in F. S. Vigliante et al. Patent 3,268,669, issued August 23, 1966. Data is transmitted to the control center from the various switch units for processing, after which operating instructions are returned to the switch units for implementation. These instructions direct switching operations which serve to interconnect pairs of lines in communication on a time division basis.

The control center of the instant embodiment is in two sections; viz., the input-output section and the call processing section. The input-output section is in direct contact with all of the switch units and serves to store messages received from the switch units until requested by the call processing section. The input-output section also receives messages from the call processing section for subsequent dissemination throughout the system.

The principal functions of the call processing section are to establish and supervise calls through the system. It records the status of each call and maintains this status current in accordance with the actions of the calling and called parties and the condition of equipment involved. The call status is maintained in a temporary memory designated the call store, with updating accomplished under control exercised by a stored program. The program directs the correlation of new messages obtained from the input-output section with current status records and the dissemination of orders and information for subsequent system action.

This centralization of control facilities, of course, increases the risk of service interruptions due to component failures and might even result in a complete breakdown of system operation due to a single, faulty component. Therefore, in order to avoid the possibly catastophic results of such a failure, critical units are duplicated throughout the system, such redundancy permitting the system to continue in operation despite the presence of trouble conditions.

A maintenance program contained in the active program store is initiated after each cyclical scan of the active call store to test the operability of all components active in processing calls. A component exchange control in the maintenance center is activated after a fault in an active component has occurred to interchange the active and standby components. After detecting a fault in an active component and performing the component interchange, the maintenance program determines the operability of the components now in the standby state in order to identify and to maintain out of operation the particular component in which the fault has occurred.

The mere substitution of standby for active components, when a fault is detected in an active component, does not guarantee that the substituted component is fault-free at the time of the substitution. If a fault were present in the substituted component, of course, the entire system could be put out of service. Thus the operability of the components in the active state are determined by the maintenance program simultaneously with the testing of the interchanged faulty components. Normally, the presence of a fault in a standby component will prevent an interchange. These expedients avoid the possibility of such a catastrophic result in a system in continuous service.

Components in critical positions are tested frequently, and if a certain sequence of maintenance test signals is not detected, a component interchange occurs automatically. Once having been switched to the standby status, control equipment indicating a trouble condition is tested exhaustively by the maintenance program in order to isolate the faulty component and to identify it for maintenance personnel. Such maintenance on standby components is performed under control of corresponding active components while the system remains in service.

It is also possible that the duplicated system program may develop a fault which would normally go undetected in such a system arrangement. Thus the maintenance center comprises a program store comparator for comparing the identical programs in the program stores upon interruption of the call processing operation and for restoring the formerly active control components to service upon detection of a mismatch.

All of these provisions are calculated to provide maximum protection against catastrophic failure. The underlying philosophy in the execution of the maintenance program is the exploitation of the system's ability to thoroughly and continuously analyze itself, using programs from the program store, and thus requiring a minimum of special auxiliary equipment for test purposes.

It is a feature of this invention that a maintenance routine permits the simultaneous testing of active and standby units by the active unit and the interchange of units upon detection of a fault in the active unit when coupled with the absence of a fault in the standby unit.

Figure 2:
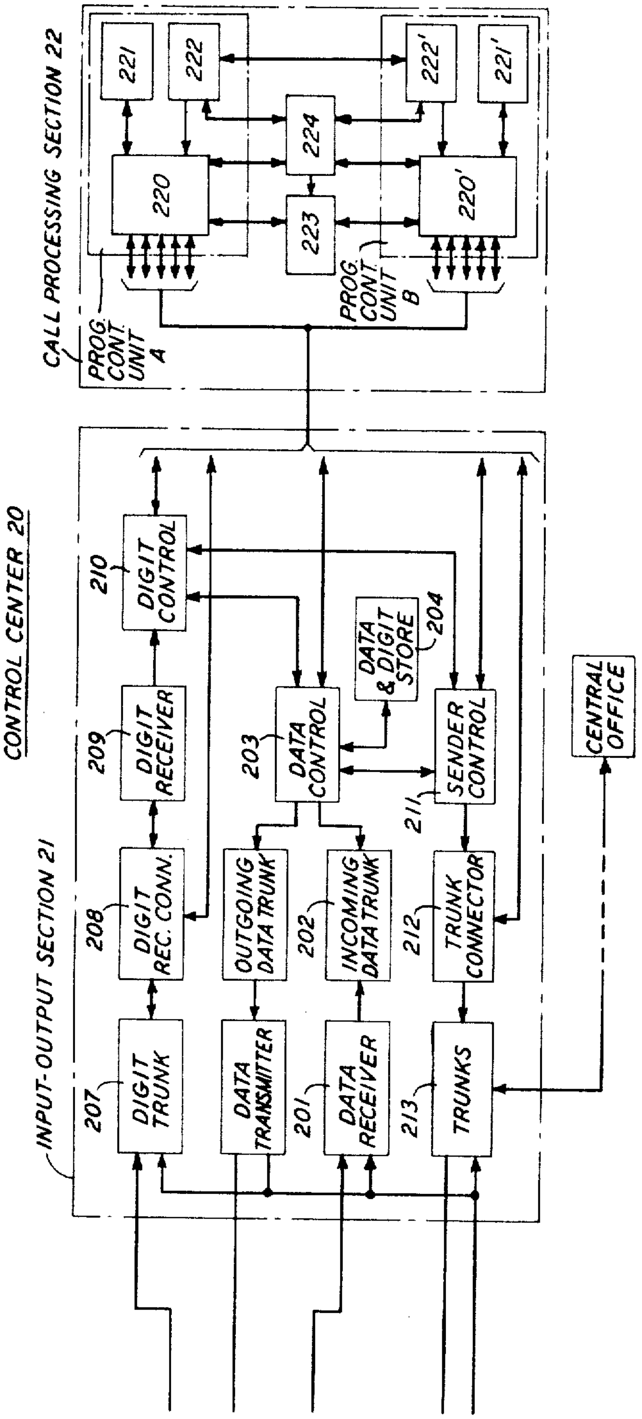
Figure 3:
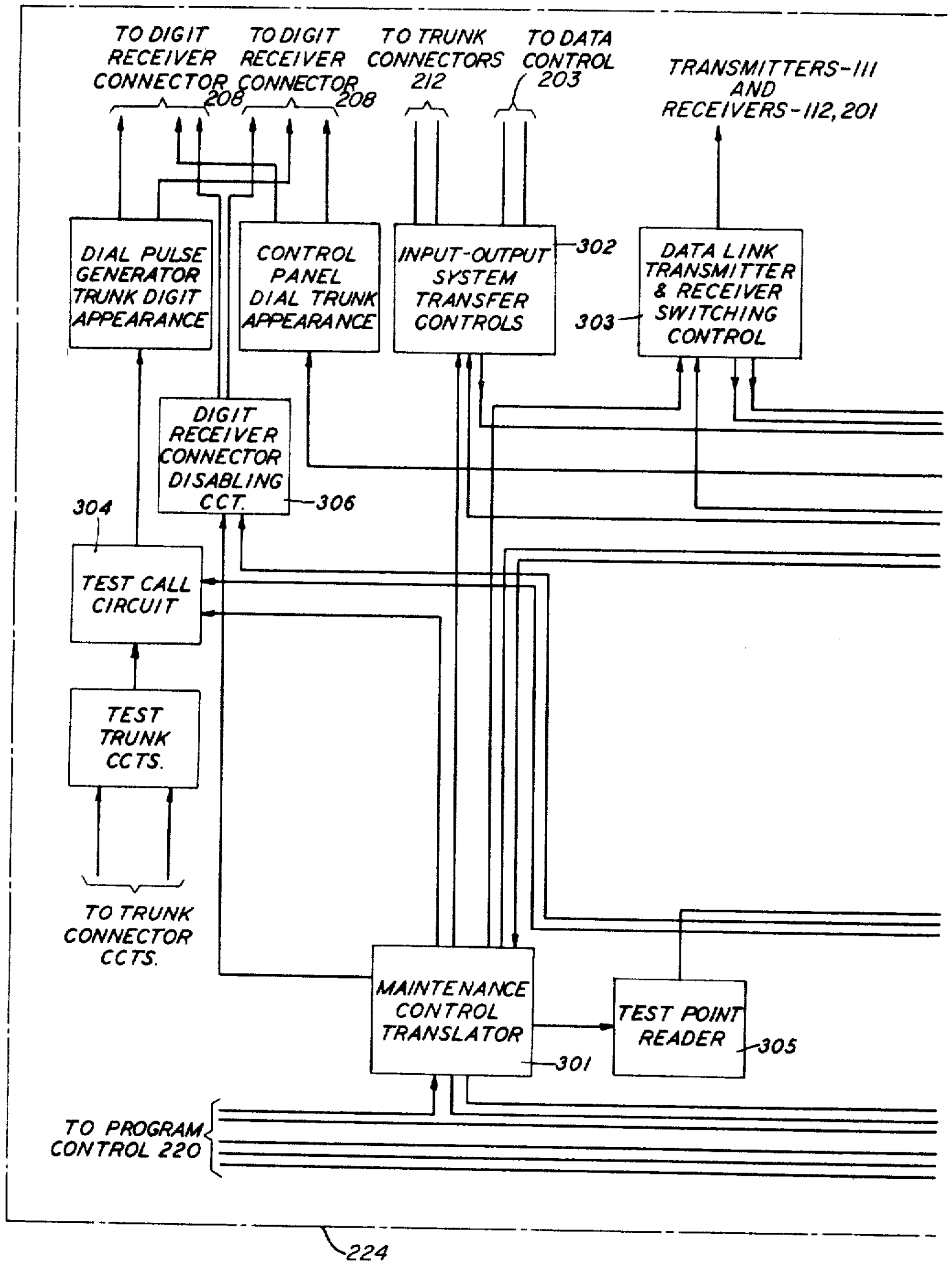
Figure 4:
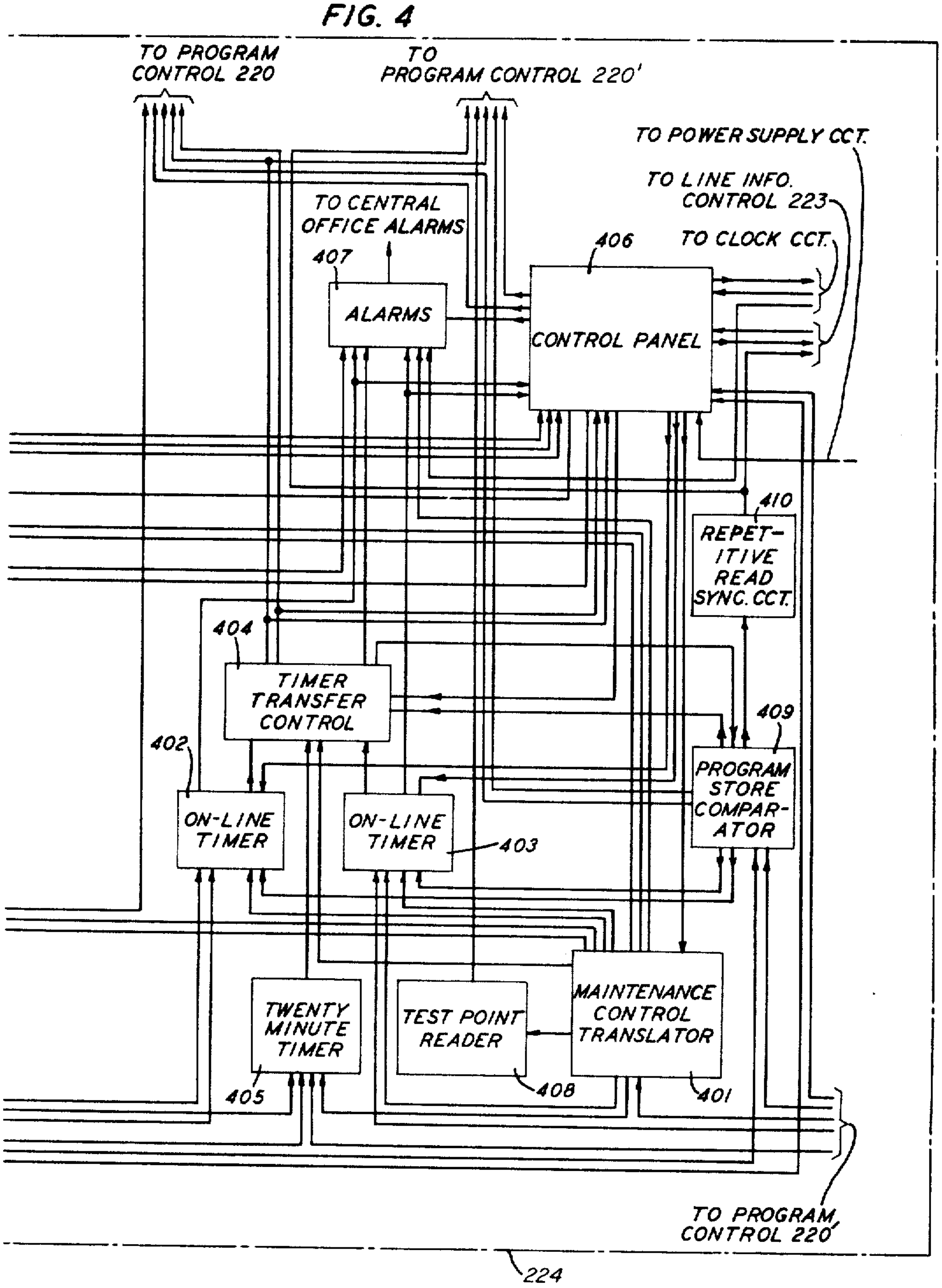
Figure 5:
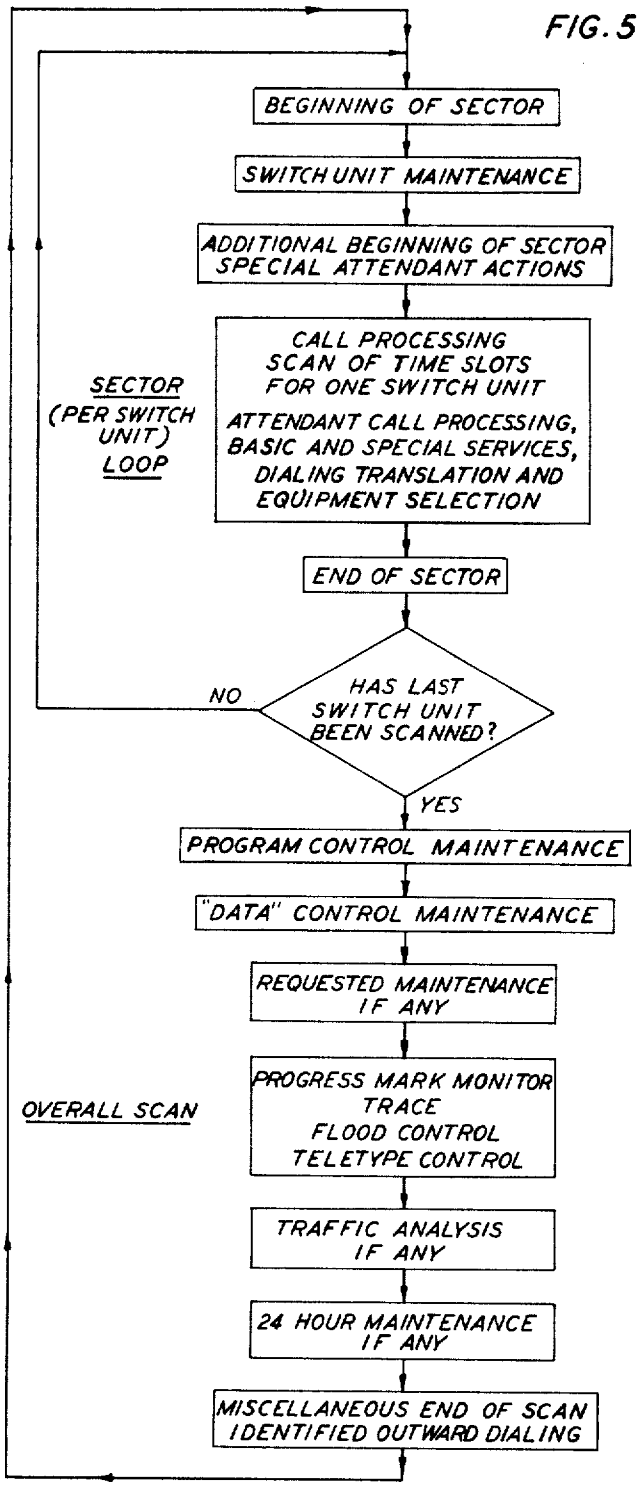
Figure 6:
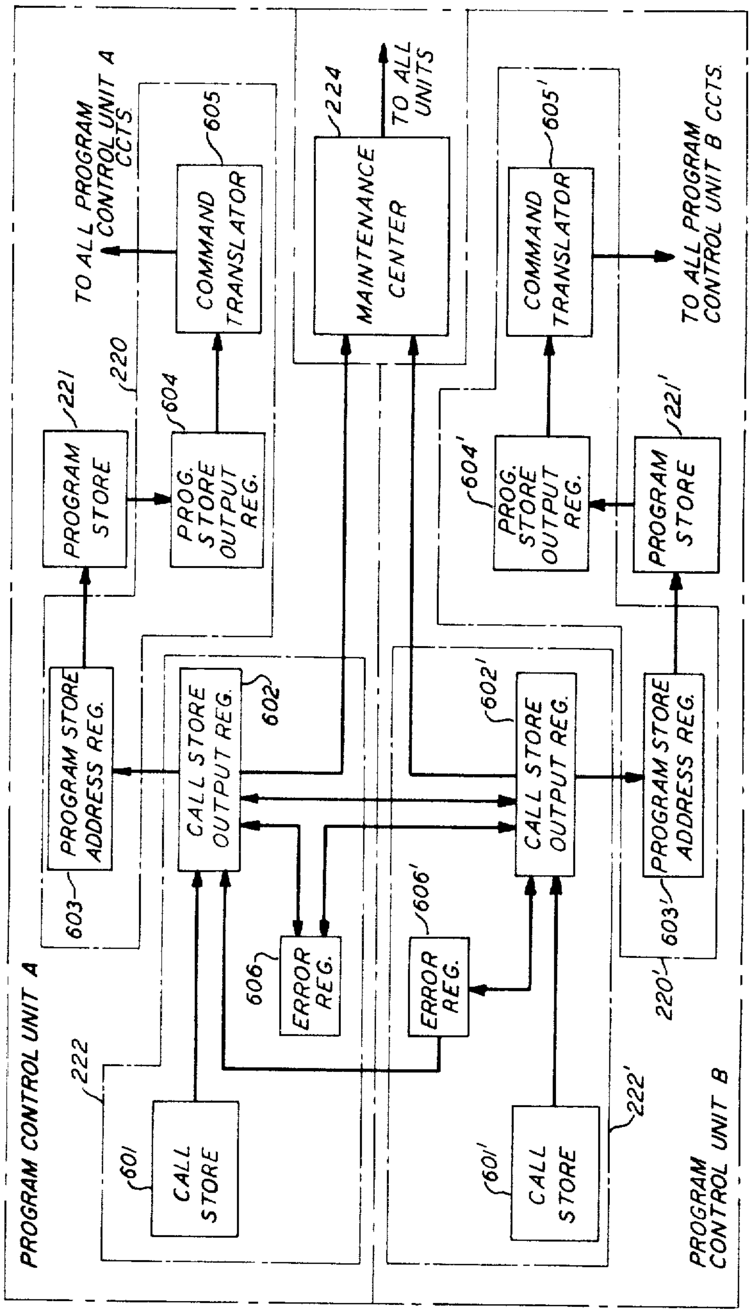

A complete understanding of this invention and of the above-noted and other features thereof may be gained from consideration of the following detailed description and the accompanying drawing, in which:

FIGS. 1 and 2 are block diagram representations of a telephone system incorporating this invention;

FIGS. 3 and 4 contain a more detailed representation of the maintenance circuits involved in this invention;

FIG. 5 is an over-all view of the entire system program indicating the order of appearance of maintenance routines in accordance with this invention; and FIG. 6 is a representation in block form of the various components included in the on-line and off-line program control circuits which are involved in the execution of maintenance routines.

INDEX

| | Column |
|---|---|
| I. General System Operation | 3 |
| II. Maintenance Center | 5 |
| A. Maintenance Control Translator | 5 |
| B. Input-Output System Transfer Control | 6 |
| C. Data Link Transmitter and Receiver Switching Control | 6 |
| D. Test Call Circuits | 7 |
| E. Timers and Transfer Control | 7 |
| F. Alarms | 8 |
| G. Control Panel | 9 |
| H. Test Point Reader | 9 |
| I. Program Store Comparator | 9 |
| J. Repetitive Read Synchronizing Circuit | 9 |
| K. Digit Receiver Connector Disabling Circuit | 9 |
| III. Maintenance Programs | 9 |
| A. Call Processor | 11 |
| (1) On-Line Tests | 12 |
| (2) Off-Line Tests | 13 |
| (3) Response to a Failure Report | 14 |
| B. Switch Unit | 15 |
| C. Data Control | 16 |
| D. Trunks | 16 |

I. GENERAL SYSTEM OPERATION (FIGS. 1 AND 2)

Turning now to the drawing, the principal characteristics of the Private Branch Exchange system serving to illustrate the maintenance operations in accordance with this invention are depicted in FIGS. 1 and 2. The switch unit (FIG. 1) is essentially as described in R. C. Gebhardt et al. Patent 3,225,144, issued December 21, 1965. Similarly, the control center (FIG. 2) is disclosed in detail in the aforementioned Vigliante et al. patent, but for purposes of understanding the maintenance operations, a brief system description is provided hereinafter. Various of the elements depicted in FIGS. 1 and 2 but not described herein are fully disclosed in these other applications to which reference may be made; further, to facilitate consideration of these other applications, the same reference numerals are employed herein for the switch unit and control center as in the Seley et al. application.

Time division switching is based on the principle that periodic samples of an information signal are sufficient to completely define the signal and that such samples, gleaned from a multitude of signals, may be transmitted in a regular sequence over a time-shared common path. Thus a plurality of terminal stations such as subsets 1–*n* (FIG. 1) is connected to a common transmission bus 100 through corresponding line gates 101–101*n*, which gates are sampled on a selective basis for a predetermined time interval in a recurrent cycle of time intervals. If a pair of gates is closed simultaneously for the prescribed time interval, a sample of the information available at each terminal will be transferred to the opposite terminal via the common transmission bus 100. Low pass filters are included in the line circuits to smooth out the signal samples received through the active gates. Thus a bilateral connection is established which, although physically connected for only a small fraction of the time, appears to be connected continuously due to the smoothing action of the line filters.

It is characteristic of contemporary PBX operations that they are self-contained, i.e., the transmission circuits, switching network and all control circuits are located together on the customer's premises. The system in accordance with the illustrative embodiment of the invention extends the common control concept by utilizing a control center 20 which directs the call processing in a number of remotely located PBX switch units 10–*n*. Advantageously, the control center 20 may be located at a telephone central office, while the PBX switch units 10–*n* may each be located in a different PBX customer's office.

The control center 20 performs all of the logical functions required to process calls through each of the remote switch units 10–*n*. It consists of an input-output section 21 and a call processing section 22, the former comprising equipment which communicates directly with each of the switch units 10–*n* and the central office connected to the control center 20, while the latter performs the actual processing required to establish and supervise calls at the various switch units.

A single memory unit, the data and digit store 204 in the input-output section 21, receives and stores information from all of the switch units and is capable of working with all of the switch units simultaneously. The call processing section 22 operates on one switch unit at a time and on one call at a time within a given switch unit. As each call is processed, any action required is formulated as a message by the call processing section 22 and placed in the input-output section 21 for transmittal to the proper switch unit 10–*n*.

The operation of the system may be understood more readily from consideration of a typical intra-PBX call. Assume subset 1, FIG. 1, goes off-hook. This change of status is recognized by the scanner 110 which in turn formulates a message containing the corresponding line number and the new supervisory state. This information is transmitted to the control center 20 via the data link and a data receiver 201 in the input-output section 21. Subsequently, all of the data receivers 201 are scanned by the data control 203 which serves to direct the incoming message via an incoming data trunk 202 into the data digit store 204.

The store 204 is interrogated periodically by the call processing section 22. The call status control 222, contained therein, maintains a record of the current status of every call or prospective call in the system. The program control 220 directs the sequential scan of this call record, checking the current status of each call against information received in the interim and updates the record to agree with its current or newly established state. At a particular point in time the program control 220 will take the message contained in the data and digit store 204, compare it with the current status of subset 1 as contained in the call status control 222 and, finding it to be a request for service, register this condition in a temporary memory contained in the call status control 222.

The program control 220 in conjunction with the program store 221, which contains all commands in proper sequences for every operation required in the system, now arranges for the connection of subset 1 to a preselected digit trunk 207. A message to implement this action is sent via the receive leg of the data link to the data receiver 112 and transferred to the network control 114 via the data distributor 113. The network control in turn stores this message and translates it in order to effect connection of the appropriate line to the digit trunk in a predetermined time interval.

Dial tone is then transmitted from the digit receiver 209 via the digit trunk 207 to the subset 1. Upon completion of dialing, the control center 20 disconnects the digit trunk and establishes a ringing connection to the called line. Upon answer, the called line condition is registered in the call status control 222 and a talking connection is established.

From this example it may be seen that all changes in supervisory states of lines connected to each of the remote switch units result in a data message being transmitted from the scanner 110 to the control center 20. Answering messages are subsequently delivered from the control center 20 to the switch unit 10 where they are utilized by the network control 114 to establish appropriate connections in predetermined time slots. Trunk circuits 213 are available to connect PBX lines terminating on one switch unit to other remote switch units in the same system, to a central office, or to other PBX's.

Control of all intra- and inter-switch unit operations is exercised by the control center 20. In such a system failures which occur in a switch unit 10 are not as critical as those occurring in the control center 20, since the former could at most disrupt service pertaining to the one switch unit, while the latter may disrupt the entire system operation. However, the switch unit problem is aggravated by its remote location in relation to the control unit.

In order to obtain the necessary reliability in the switch unit, some redundancy is provided including duplication of the transmission bus 100, scanner 110, data transmitter 111, data receiver 112, data distributor 113, network control 114 and attendant translator 115. In the control center 20 the following components are duplicated for reliability purposes: data control 203, digit control 210, sender control 211, program control 220, program store 221 and call status control 222.

II. MAINTENANCE CENTER (FIGS. 3 AND 4)

To provide the necessary system reliability, a maintenance center 224 is contained in the control center 20. It has the capability of automatically switching the duplicated circuits in the control center or in any switch unit from an active, "on-line" to a standby, "off-line" status. A maintenance program contained in the program store 221 operates in conjunction with the call status control 222 to advise the maintenance center 224 of the particular circuits currently in the on-line condition which are to be switched off-line.

The maintenance center also provides for detection ot failures within the system, the localization of the trouble, and its identification for external repair. The maintenance center permits these functions to be performed without destroying the continuity of normal call processing activities. In this regard self-checking and self-correcting circuits have been included in the maintenance center controlling those areas which could, by failing, seriously disrupt the operation of the system. Each major component of the maintenance center, as depicted in FIGS. 3 and 4, will now be described as to the particular functions performed in satisfying the maintenance program described thereafter.

A. *Maintenance control translator* (*FIGS. 3 and 4*)

There is a maintenance control translator associated with each program control circuit. Thus maintenance control translator 301 (FIG. 3) receives commands only from program control 220, while maintenance control translator 401 (FIG. 4) receives commands only from the duplicate program control 220' (FIG. 6). As their names imply, these units translate the commands received from the respective program control circuits into signals subsequently directed to various parts of the maintenance center. The translators, which are duplicates, each comprise AND gates and flip-flop registers, as well known in the art, arranged such that a command received from the corresponding program control over a plurality of leads in parallel will identify one-out-of-*n* crosspoints in an *n* crosspoint matrix. Translators suitable for this purpose are, of course, well known in the art. In this illustrative embodiment translators 301 and 401 each provide for the operation of any one of 512 crosspoints under control of a nine bit or binary digit input. Thus register 602 provides instructions or commands to translator 301 on nine input leads terminating on nine AND gates which in turn are enabled by a signal from command translator 605 to store the input signals in nine corresponding flip-flop registers. The register outputs are applied in groups of three to three translation circuits each consisting of sixteen AND gates and thus capable of translating the three bit input into a 1-out-of-8 code. The eight possible outputs from each of the three translation circuits thus identifies any crosspoint in an $8 \times 8 \times 8$ or 512 point matrix, which number is more than enough to provide command signal inputs to all of the maintenance center components.

Inputs may be received from both program control circuits at the respective translators 301 and 401 concurrently. However, the signals from the off-line program control may be inhibited at the corresponding translator in conjunction with operation of the control panel 406. Thus the maintenance control translator serves to activate a particular maintenance circuit in order to perform a particular test in the maintenance routine upon receipt of the appropriate command from the corresponding program control circuit.

B. *Input-output system transfer controls* (*FIG. 3*)

The input-output system transfer controls 302 (FIG. 3) are activated by signals from either maintenance control translator 301 or 401 and serve to generate signals which indicate to the system which of the duplicated data controls 203, digit controls 210, sender controls 211, and trunk connectors 212 in the input-output section 21 are in the active or on-line state and which of these duplicated units are in the standby state. In the latter instance, outputs from the corresponding translator 301 or 401 are ignored. Since the transfer controls circuit 302 has crosspoint appearances in both translators 301 and 401, either program control can, by gating the appropriate address to the corresponding maintenance control translator, activate flip-flop registers in the transfer controls circuit 302 indicating on-line or off-line conditions of the respective input-output section 21 units. The reason for this will become apparent in the later description of the maintenance program which provides for a variety of alternate paths through the network if a failure is reported in any one of the duplicated units in the input-output section 21.

The transfer control circuit 302 comprises AND gates and flip-flop registers arranged to permit the foregoing operations. In this illustrative embodiment four flip-flops administer the inputs to the duplicated control circuits and two flip-flops perform the same function for the trunk connector circuits. The setting of these flip-flops is determined by signals from translator 301 or 401 and this setting in turn determines the particular data control and trunk circuits which are in an active condition and which are in a standby condition.

C. *Data link transmitter and receiver switching control* (*FIG. 3*)

Each switch unit in the system is coupled to the control center by a data link which carries all data necessary to the establishment of intra-switch unit and inter-switch unit calls. Because of the vital nature of this link it is duplicated, as are the data transmitters and receivers at each end thereof. The data link transmitter and receiver switching control 303 is provided to permit the periodic switching of the spare data link and transmitter-receiver combinations for each switch unit into or out of service, thus facilitating the testing of these components while off-line to detect any possible trouble conditions. Again the input signals to the switching control 303 are received from either of the translators 301 or 401.

The switching control 303 comprises a plurality of logic gates and flip-flops, the latter serving to remember which of the controlled components are in service. Their outputs are utilized to energize relays which perform the actual switching of the data links. Thus, for example, a flip-flop in the set state indicates that one of the data links is "on-line" and that the other data link is "off-line." A relay connected to the reset output thus enables contacts to interchange the data links when the flip-flop is reset.

D. *Test call circuits* (*FIG. 3*)

The maintenance program requires periodic testing of components in each switch unit 10–*n*, which is satisfied by placing test calls through the network. The manner of conducting these test calls is disclosed in detail in M. E. Alterman Patent 3,238,311, issued March 1, 1966.

When test calls are being made, multifrequency digit signals received from certain lines are distinguished from dial pulse digit signals received from other lines by their transmission over separate paths between the maintenance control translators 301, 401 and the test call circuitry. Certain portions of the test call circuitry are used for each type of digit signal received. The test call circuit 304 then simulates the different signals to which the corresponding digit receiver 209 must respond. Thus the test call circuit 304 serves to test the digit receivers 209, the digit receiver connectors 208 and the digit controllers 210.

The pulse generating equipment comprises logic gates, flip-flops, multivibrators and pulse counters, as known in the art, arranged in a manner to provide the appropriate multifrequency and dial pulse signals requested by the commands received through one of the maintenance control translators 301, 401. In this illustrative embodiment the dial pulse generator has sixteen AND gates, each corresponding to a particular one of sixteen possible conditions which can be generated by the dial pulse generator. Each input gate is a crosspoint in the corresponding maintenance translator. A multivibrator driving a 4-stage binary counter determines the duration for application of the type of pulses selected via the sixteen input AND gates. Similarly, a selected one of a series of eight flip-flops and the corresponding relay driver determines which of eight frequencies utilized in multifrequency signaling will be employed. The oscillator comprises two tank circuits developing selectively the particular desired frequencies.

E. *Timers and transfer control* (*FIG. 4*)

This equipment includes two on-line timers 402 and 403, one corresponding to each program control 220, 220'. Each of these timers produces an output signal two seconds after its most recent input. They will normally receive inputs from a test program conducted at the end of each cycle or scan of the call store 601, 601' (FIG. 6) included in the call status controls 222, 222', respectively, which scans occur many times during the two second interval. Thus the on-line timer fails to produce an output during normal operation. When an output is provided by time-out of the on-line timer, it is an indication of trouble existing in the on-line control unit. Such an indication produces an output signal to the timer transfer control 404 which in turn serves to transfer system control to the off-line control unit. In order to protect against the possibility of any portion of the maintenance program resetting the on-line timer prior to completion of the test program in any one cycle of the call store, the on-line timer requires as an input three different codes gated to it in a specific order from the on-line controls.

The on-line timer circuits 402 and 403 comprise logic gates arranged to receive and act upon the coded signals in the desired manner. In this illustrative embodiment the three codes which must be gated to the on-line timer in sequence in order to reset it are 001, 010 and 100. Thus a series of AND and OR gates setting two flip-flops in a proper sequence will enable output gates to provide the desired resetting output. The timers themselves may comprise, for example, blocking oscillators as known in the art.

Also included in the timers and transfer control is a twenty minute timer 405 which, as its name implies, transfers control of the system from the on-line controls to the off-line controls every twenty minutes provided that the off-line controls are functioning properly. Thus the twenty minute timer 405 comprises a blocking oscillator and related logic gates serving to advise the timer transfer control 404 that twenty minutes has elapsed since the previous transfer was effected. This timer may be disabled by a specific code transmitted from the on-line control unit if it is aware of a trouble condition existing in the off-line controls. This timer may be timed-out prematurely if the on-line controls desire an immediate transfer. All transfers which occur following a time-out of the twenty minute timer 405 are delayed until a command is received from on-line controls indicating an end of the current scan of the call store, such that no telephone service will be disrupted by the transfer. However, the circuitry is arranged such that if this command is not received within two seconds after the twenty minute interval, the on-line timer proceeds with the transfer.

The timer transfer control 404 comprises logic circuitry arranged to set a pair of flip-flops so as to enable one control unit to operate the system while inhibiting the other control unit and to reset the pair of flip-flops in order to enable the other control unit to operate the system while inhibiting the one control unit. It also produces signals which enable and disable many of the controls included in the control panel 406. As indicated, it performs its transfer function upon receipt of signals either from on-line timer 402 or 403 or from the twenty minute timer 405. Due to the extremely vital functions which this circuit performs, it is equipped with its own alarm circuitry which detects any failure that might lead to a system failure, e.g., a failure which might place both control units on-line or off-line simultaneously. Since there is no automatic means for checking this alarm circuitry, it is duplicated. If either duplicated circuit produces an output, it will automatically place one control unit on-line and the other off-line. It also completely disconnects the faulty timer transfer control from the system in such a manner that it can only be released manually.

The maintenance program is also arranged such that the duplicated checking circuits in the timer transfer control 404 can predict which control unit was intended to be on-line before the failure occurred and to effect this condition when the failure occurs. Also, if system operation has been interrupted, the on-line timer circuits 402 and 403 provide restarting signals through the timer transfer control to the appropriate control unit. The foregoing operations of the timer transfer control 404 are realized by a particular arrangement of logic gates, relays and flip-flops, all of the components being well known in the art.

F. *Alarms* (*FIG. 4*)

The alarms 407, as their name implies, indicate audibly and visually to the central office which particular components in the system are in trouble. Certain system difficulties can be bypassed without disrupting service, in which instance minor alarm signals are provided through relays in the alarms circuit 407. Redundancy is provided in this instance as there is no way of determining automatically that the minor alarm system is in proper operating condition. The redundant circuits are checked periodically by maintenance personnel.

Alarms 407 also provide major alarm signals to the central office, indicating a system failure which is likely to disrupt telephone service. The circuitry is similar to that provided for the minor alarm system.

G. *Control panel* (*FIG. 4*)

The control panel 406 consists of an array of lamps designating visual trouble conditions in the system and also the content of various registers at any particular time. Basically, the unit provides maintenance personnel with a guide for locating system troubles and failures to permit prompt repair. Sufficient controls are provided to permit manual transfer of units for necessary repair, et cetera.

H. *Test point reader* (*FIGS. 3 and 4*)

A test point reader is associated with each maintenance control translator. Thus test point reader 305 receives information from control translator 301, and test point reader 408 receives information from control translator 401. This circuit enables the maintenance program to interrogate various test points within the control center to assure proper voltage levels there. Among the items checked by this circuit are fuse alarms, power supply alarms, clock alarms and switch unit power failure relays.

The maintenance program gates an appropriate command to the maintenance translator which permits the interrogation of as many as sixteen test points simultaneously by the corresponding test point reader 305, 408. The reader comprises conventional logic gates serving to direct the status of the various test points to the output register in the call status control 222 or 222' upon command.

I. *Program store comparator* (*FIG. 4*)

The program store comparator 409 compares the entire content of the two program stores 221, 221' as a means for checking for errors in the memory content. It comprises conventional logic circuitry arranged to interrupt the call processing operation once every two seconds in conjunction with the on-line timers 402 and 403, compare all words in the two stores, and then permit resumption of the call processing. Visual indication of the most recent comparison results is provided by alarms in the control panel 406. If a mismatch is encountered during the comparison, the program store comparator 409 will discontinue the comparison operation and restore the formerly on-line controls to service. The formerly off-line controls will be held at the address corresponding to the mismatch location in its corresponding program store address register. Thus maintenance personnel are made aware of the exact location of the trouble in the program store.

J. *Repetitive read synchronizing circuit* (*FIG. 4*)

The repetitive read synchronizing circuit 410 comprises conventional logic circuitry which provides the program controls 220, 220' and the line information control 223 with synchronizing signals at regular intervals which permit the control panel 406 to execute commands in the program controls and to read the line information store repetitively.

K. *Digit receiver connector disabling circuit* (*FIG. 3*)

The function of this circuit 306 is to disable either of the digit receiver connectors 208 in response to the appropriate command being gated to one of the maintenance control translators 301, 401. This circuit comprises a plurality of AND gates and flip-flops arranged to receive separate inputs from the two maintenance control translators and to transmit signals to the corresponding digit receiver connectors.

III. MAINTENANCE PROGRAMS

In order to gain an appreciation of the function and operation of the maintenance program, it is necessary to understand in general terms the entire system program sequence. Virtually the entire program is a single large loop, as depicted in FIG. 5. It may be recalled from the earlier description that the system comprises a plurality of remote switch units terminating telephone lines and capable of interconnecting lines within a single switch unit or between switch units, all under control exercised by the control center 20. In order to perform these control functions for the entire system, the control center operation is programmed so as to perform a small amount of work for each switch unit in turn during each cycle of system operation. Interspaced with the switch unit activity is a small amount of maintenance activity pertaining to the corresponding switch unit and also components of the control center. At the end of each cycle of operation or scan, additional maintenance activities of a critical nature pertaining to the call processing section 22 of the control center 20 are performed. Thus the control center, which operates extremely fast relative to the switch unit operation, is able to keep pace with the call establishment and disestablishment in each switch unit by allocating time in each cycle of system control operation to each switch unit analogous to the time division switch operation.

As noted in FIG. 5, the program is divided into sectors, one sector corresponding to each switch unit. The beginning of sector program, which is repeated prior to every sector scan, determines what will be accomplished during the subsequent sector scan in the current over-all scan or cycle of control center operation. This determination is based upon the information received from the corresponding switch unit during previous scans as well as the current state of the control center equipment. Included in the beginning of sector scan are the switch unit maintenance routine and the maintenance test point sequence, which routines are of particular interest to the current disclosure and will be discussed more fully hereinafter.

Following the beginning of sector program, the control center 20 proceeds to the processing of calls involving the particular switch unit currently being scanned. This procedure is discussed at length in the aforementioned Gebhardt et al. and Seley et al. applications.

The call processing for a particular switch unit is followed by an end of sector scan which processes messages arriving during the current sector scan which are not concerned with calls currently in progress, e.g., requests for service. Upon completion of its functions, the end of sector scan determines whether or not all sectors, i.e., switch units, have been scanned in the current cycle. If there are additional sectors to be scanned, the program will then proceed to the beginning of sector sequence for the succeeding sector. However, if the sector under scan is the last sector, the end of sector scan will switch to an end of scan sequence.

As indicated in FIG. 5, the end of scan sequence includes various maintenance programs including the vital program control maintenance as well as various maintenance routines concerning the input-output section 21. There may be insufficient time during each over-all scan to perform all of the required control center maintenance operations that are programmed for performance, so that transfer vectors are included in the program to permit a portion of the end of scan maintenance to be performed during one cycle, the vector then designating the point at which the maintenance routine shall be reinitiated during the next cycle.

Also, if time permits, action by maintenance personnel, as requested by the control unit (including removal, testing and restoration of specified components) may be performed. Restoration puts the restored equipment automatically under test and causes its automatic removal in the event that it is still faulty. The requested maintenance program may also serve to provide information about the current status of the system or to conduct particular tests in order to detect marginal conditions.

Other maintenance routines which are not performed during each system scan include routines which update and check duplicate call status records, those involved with the production of trouble reports, traffic measurements and preventive maintenance, the latter being performed once in each twenty-four hour period. Other maintenance not performed in the normal maintenance program involves truly manual operations, serving to compare the content of the two control units.

A. *Call processor*

The call processing section 22, FIG. 2, includes duplicated program controls 220 and duplicated call status controls 222. When one program control and the corresponding call status control are on-line or actively serving the system, the other program control and associated call status control are in an off-line or standby condition.

Each program control is associated with a distinct one of the program stores 221, 221', FIG. 6. The line information control 223, FIG. 2, thus is the only unit in the call processing section 22 which is not duplicated. Each program control has access to the line information control 223, but if it is out of service, the special services which make use of it are lost during the out of service interval. However, basic call processing is not affected and continues in the normal fashion.

Maintenance for the call processing section 22 may be divided into three categories; viz., on-line tests, off-line tests and line information control tests. The on-line tests are utilized to detect trouble conditions in the on-line unit consisting of one program control and the associated call status control. If a trouble condition is located, the maintenance center is alerted to effect a transfer of system operation to the off-line unit. No attempt is made to isolate or remedy a trouble condition while the ailing unit is on-line. However, in most instances the switch of control units does not take place until a rerun of all on-line maintenance routines has been completed. A second failure report will then effect the interchange.

The off-line units are tested under the control of the on-line units. In this instance the tests are diagnostic; troubles are detected, identified and located, followed by a message print out to the maintenance personnel for correction of the trouble. Similar tests are conducted on the line information control 223. As indicated, only a portion of the call processor tests are performed at the end of each system scan, as insufficient time is available to perform all necessary tests at that time. In accordance with the instant illustrative embodiment of the invention, 256 system scans are required to completely test the call processing section 22.

The basic procedure followed by the call processing section 22 in carrying out the maintenance program comprises the execution of a sequence of commands which is best described with reference to FIG. 6. In this instance the call processing section 22 is illustrated as being divided into control unit A and control unit B. Control unit A comprises components included in one of each of the duplicated program controls 220, program stores 221 and call status controls 222. Similarly, control unit B comprises components included in the other program control, program store and call status control. Only those components germane to the description of the initiation and sequential processing of maintenance commands are illustrated in FIG. 6. It is assumed that control unit A, which contains the unprimed components, is currently on-line.

Each command is contained in a particular location of each program store 221, 221'. An instruction directing the call processor 22 to perform a particular maintenance routine will be encountered during the scan of the on-line call store 601. This instruction is read out of the call store 601 into the call store output register 602. It is then directed to the program store address register 603 where it serves to address the program store 221 to the first command in the designated maintenance routine. This command is thereupon read out of the program store into the program store output register 604, translated by the command translator 605 and directed to the appropriate location in the call processing section 22 for execution.

The commands comprising a particular maintenance routine are performed in a timed sequence. Thus, upon the passage of sufficient time for execution of the first command in a particular sequence, the address of the program store is advanced to the location of the next command in the current routine. If during the execution of the routine a trouble condition is encountered, the normal sequence of commands required to reset timers in the maintenance center 224 or to inhibit translation of a command currently addressing the maintenance control translator will not be forthcoming, and the maintenance center will translate and execute the current command or respond to time-out by automatically interchanging the control units.

If the sequence of commands in the maintenance routine is completed without incident, the last command in the sequence received from the program store 221 will reinitiate the scan of the on-line call store 601.

(1) ON-LINE TESTS

When call processing is completed for a particular scan, on-line maintenance tests are performed. The particular entry found at this location in the call store 601 is used to address the program store 221 to the first location of a maintenance routine concerned with the testing of the on-line program store itself. Nine transfer commands are performed, each one transferring to the next command if no trouble condition is encountered. If any part of the program store address or output equipment is in trouble, one of the transfer commands will not be performed properly. This will prevent the transmission of a command to the appropriate on-line timer 402 or 403 in the maintenance center 224 and that timer will time-out.

Following the successful performance of the series of transfer commands, the maintenance routine enters a series of clear and gate commands. For this purpose a word is read into the on-line call store output register 602 and is subsequently gated through several distinct paths terminating in the same output register. Several of these gating path loops are traced out by this series of commands, each originating and terminating at the call store output register. The complete series includes four different words gated through the various gating path loops. After each test is completed, the test word itself is used as an address to the on-line program store 221 in order to obtain the series of commands necessary to perform the next test. Again, a failure in this routine will inhibit a command to the on-line timer in the maintenance center 224, causing an interchange of the program controls as arranged by the timer transfer control 404.

Absent any failure due to the previous series of commands, all registers in the call processing section 22 are tested by a series of clear commands. In this instance each command directs the setting of all flip-flops in the register under test. The register is then cleared and its new content gated to the on-line call store output register 602 which is subsequently checked for the reset condition in all flip-flops. Detection of a failure during the execution of one of these commands will result in the setting of a flip-flop in the on-line error register 606 and a repetition of the on-line program control test routines. A failure encountered during the retry will result in a switch of the program controls.

Upon successful completion of the preceeding test routines involving the program control circuitry, the next command encountered in the current maintenance program is a vector serving to direct the program to see of a plurality of tests which are not performed during each scan. Some of these tests are performed once every sixteen scans and others every 256 scans. The vector command thus serves to interrogate a particular counter contained in the on-line call store 601, which counter is then stepped to the test to be performed during the succeeding scan. There are several advantages to utilizing this vector approach, including the flexibility provided in the performance of noncritical maintenance operations and the ability to allocate additional time to call processing during each scan.

Among the tests performed once in each sixteen scans of the call store are those involving the logic circuitry in the on-line command translator 605 which translates and routes the commands read out of the on-line program store 221. A failure in these tests results in a repetition of all on-line tests.

Sixteen end of scan tests are required to fully test one of the matrices included in the access and output equipment of the on-line call store 601. Such tests are also performed once in each sixteen scans so that performance of a distinct one of the tests in each succeeding scan will result in the complete testing of a matrix during a sixteen scan interval. Failure of one of these tests results in a retry of all on-line tests, and a second failure produces a switch of program controls. The information in the scan counter of the call store directs the maintenance program to the particular call store test desired in each successive scan.

(2) OFF-LINE TESTS

Off-line tests of the call store 601' use the same maintenance routines as used for the on-line call store 601, the only difference being that a failure instigates the preparation of a message which is subsequently printed out for the use of maintenance personnel in determining the trouble location. The message is formulated immediately upon discovery of the trouble condition, the test during which the trouble is discovered is then completed, the trouble message is printed out, and a complete repetition of the call processor maintenance routines for both on-line and off-line equipment is initiated.

Upon successful completion of the off-line call store tests, the program is directed to testing of the line information control 223, FIG. 2, including a store and access and output equipment. These tests consist of reading selected addresses which are reserved for maintenance purposes. A failure of any of these tests results in the preparation of a trouble message which is printed out upon completion of the current test. Thereafter, the entire call processor maintenance routine is repeated.

Following the testing of the line information store, maintenance routines pertaining to the off-line program store 221' are begun. Tests tests utilize the system routines and are organized in the same way as the line information store tests. However, one of these tests is performed once every 256 scans rather than once every sixteen scans, as in the case of the line information store. The remaining tests on the off-line control unit B are also performed once in every 256 scans, each providing a failure message and initiating a complete repetition of the call processor maintenance routines. Again, the off-line control unit tests utilize the same maintenance routines as the on-line control unit tests.

An important distinction in the manner of testing the call processor 22 is encountered at this point. The routines for testing the off-line control unit B are contained in the off-line program store 221'. Thus, in order to test the off-line controls, the on-line control unit A is arranged to interrogate the off-line program store 221' at the outset of each of the off-line control unit tests in order to accomplish them. In addition, the on-line control unit A records the execution of each off-line control unit test in the on-line error register 606. The on-line control unit A then checks the on-line error register 606 periodically to determine whether these indications have been recorded upon execution of the off-line tests. Absence of such an indication at the proper time indicates to the on-line control unit that the off-line unit is in trouble.

It will also be recalled that a failure discovered during an on-line control unit test resulted in the recording of a failure indication in the on-line error register 606, followed by a repetition of the maintenance routine. A similar result is realized during the off-line control unit tests, the only distinction being that the error signal is now entered in a different location of the on-line error register 606. From these indications in the on-line error register 606, the on-line control unit A is able to identify the trouble source as existing in a particular group of elements in the off-line unit B. If the on-line error register simultaneously contains error signals reported by the on-line and off-line units, the on-line error register will be prevented from reporting the on-line error to the on-line timer in the maintenance center so that a switch of program controls will not be permitted in this instance.

(3) RESPONSE TO A FAILURE REPORT

A failure of any test results in a retry or a two second time-out. The retrial is performed so that transient errors can be distinguished from actual trouble conditions. A failure in the on-line program control or call status control will result in a repetition of all on-line tests. A failure reported during an on-line test retrial will result in a switch of control units. In those cases in which an on-line test failure results in a two second time-out, the control units are switched without a retrial of the maintenance routines. A failure reported during the off-line tests results in the print-out of a failure message, followed by a repetition of the entire call processor maintenance program including both on- and off-line tests. The complete repetition of the maintenance program is also conducted following each switch of control units.

There are two possible courses of action to be followed at the completion of the off-line call status control maintenance retrial. If an error or trouble condition is not encountered, the program will proceed to the maintenance routines concerning the line information store unless the retrial is the result of a program control switch, in which case a routine is first initiated, serving to exchange the information contained in the two call stores.

During normal call processing, the on-line call store contains current information concerning calls in progress or being established. The information in the off-line call store is updated periodically to agree with the information in the on-line call store. Such information is designated the duplicate call store information. Thus following a program control switch, the duplicate call store information will be found in the on-line call store.

The maintenance program includes routines which will exchange the current call store information for the duplicate call store information the first or second time the control units are switched. If subsequent switching of control units occurs, there is a good possibility that the failure condition producing the multiple switches is caused by information contained in the call store. Thus if after the third through the sixth program control switching operations the call store is addressing the location of information concerning a particular call, the exchange of call store information is effected, followed by the removal of the information contained at this particular address. If seven control unit switches occur, all of the information in the on-line call store is removed.

Various other tests are performed in the event of an off-line program control test failure including a block retrial of various tests. If the program control fails the block retrial, the unit is marked out of order and a message printed out for maintenance personnel. The call processing program nevertheless is permitted to utilize the off-line call store and line information store, but the control units will no longer be permitted to switch unless forced to do so by the presence of a trouble condition in the on-line equipment or upon request by maintenance personnel. Such an arrangement permits the call processing section to make use of the supplementary information contained in the off-line call store.

There are two commands which allow the on-line control unit to operate the off-line unit. The first of these commands gives the starting point in the off-line unit. It serves to gate the contents of the on-line call store output register to the off-line program store address register, read the off-line program store at the designated address, and gate the information contained therein to the off-line command translator and thence to various off-line units for execution.

The off-line command translator is normally disabled by the maintenance center 224. The second command enables this off-line command translator, thereby permitting execution of the command received from the off-line program store in the normal fashion. Thereafter, the translator is restored to the inactive state, and the program store address is incremented by one. A repetition of the second command thus will permit execution of a sequence of commands in this off-line program control.

Control signals flow from the on-line to the off-line units but not in the opposite direction. When they are encountered in the maintenance program contained in the off-line program store, they are inhibited from performance of their designated functions.

Maintenance personnel have similar access to the off-line control unit via the maintenance center 224. Thus the program store may be addressed to any desired location. The various operations to exercise the off-line unit in this manner are initiated by operation of keys located on the control panel 406 in the maintenance center 224. One significant operation in this regard is concerned with the possible trouble conditions produced by the removal of information storage media contained in the program store to effect a change therein. In order to assure that no disturbance has been encountered during this operation, the complete program store is read in a regular sequence upon operation of a key in the maintenance center.

B. *Switch unit*

The switch unit maintenance program tests each switch unit 10-*n* in turn as the space in the on-line call store allocated to the storage of information pertaining to the corresponding switch unit is reached during the system scan of the on-line call store. This space in the call store is designated a sector, and as indicated in FIG. 5, the maintenance program testing the switch unit is initiated during the beginning of sector scan. The manner of testing a switch unit is fully disclosed in the aforementioned M. E. Alterman application.

Briefly, each switch unit is tested by transmitting a message from the control unit 20 directing the switch unit to connect test lines to the transmission bus 100 in the designated switch unit in various combinations. The test lines are arranged to transmit supervisory indications to the control unit in response to conditions existing in the circuits under test. The control unit then examines the incoming messages to determine the success or failure of the tests. All of the tests performed on a given switch unit may take place during a single system scan or they may require a number of scans, depending upon the availability of an outgoing data trunk to accommodate the test messages.

If the test of a particular switch unit encounters a failure condition, the entire test is repeated, and if the failure report is again received, a maintenance routine is entered which switches different components into the switch unit under test. First the duplicated data controls 203 are interchanged and the tests repeated. If a failure is again reported, the program controls 220 are interchanged and the tests repeated. Another failure report results in a second interchange of data controls 203. If the failure report is still received at this point, all possible equipment arrangements having been utilized unsuccessfully, a trouble report is printed out and further maintenance operations involving this switch unit are inhibited. If during the various transfers of equipment in the control unit a successful test is performed, the maintenance routine identifies the defective component so that it can be repaired by maintenance personnel.

Other switch unit tests involve duplicated equipment in the switch unit itself. In this case when a trouble condition is reported and the various possible combinations of control unit components have located a successful path to the switch unit without determining the source of trouble, the various combinations of duplicated transmission bus and scanner components in the switch unit will be attempted in the same fashion until the faulty unit is identified.

C. *Data control*

The data control maintenance routine tests various units in the input-output section 21. As indicated in FIG. 5, this routine is performed at the end of a scan following the program control maintenance routine. It consists of five basic groups of tests which check in turn the operation of the data and digit stores 204, the digit receiver connecter 208, the digit receivers 209, the trunk connectors 212 and the logic of the sender control 211.

In case of a failure, the data control maintenance routine follows the same general procedure as that utilized by the switch unit maintenance routine. A first test failure will result in a repetition of the entire routine. A second failure will inhibit switch unit maintenance, interchange duplicated components, and repeat the particular test or group of tests. If a working arrangement is encountered, the last component to be switched out of service will be designated as inoperative. If a working arrangement cannot be found, the data control maintenance will permit switch unit maintenance to continue while inhibiting its own further operation.

D. *Trunks*

Trunk maintenance is performed at the beginning of each sector scan, FIG. 5, and involves three different types of tests. It first determines the ability of a switch unit to establish a working conference connection among a plurality of lines. It then checks the ability to establish a connection between the control unit and the central office and finally it checks the operation of the digit trunk circuitry.

Upon failure of one of the tests in the trunk maintenance routine, the entire sequence is repeated. A second failure involving the conference test results in inhibition of conference calls in the switch unit involved. The other trunk tests will begin switching major blocks of equipment after a retry failure is encountered. Again the equipment last changed will be designated as the faulty equipment. If a working mode cannot be found for any one of the trunk tests, further maintenance on the corresponding switch unit is inhibited.

It is to be understood that the above-described arrangements are illustrative of the application of the principles of the invention. Numerous other arrangements may be devised by those skilled in the art without departing from the spirit and scope of the invention.

What is claimed is:

1. A data processing system control center comprising an on-line unit containing components active in processing data, said on-line unit comprising an active call store containing information pertaining to the processing status and instructions for the maintenance of components in the control center, an active program store connected to said active call store and containing maintenance programs for testing the operability of all of said control center components, an off-line unit containing components in a standby state including a standby call store and a standby program store connected to said standby call store and containing a duplication of the information in said active program store, means for permitting the maintenance program in said active program store to initiate the maintenance program contained in said standby program store in order to test standby components simultaneously with the testing of active components, a maintenance center comprising a transfer control circuit, and means responsive to the detection of a fault in said on-line unit coupled with the failure to detect a fault in said off-line unit in the course of a maintenance program originated by said active program store for enabling said transfer control circuit to interchange said active and standby components.

2. A data processing system control center in accordance with claim 1 wherein said enabling means comprises means enabled by the maintenance program contained in the said active program store for recording the results of the standby component tests and means operative upon the recording of a standby component fault for inhibiting an interchange of said active and standby components.

3. A data processing system control center in accordance with claim 1 and further comprising means responsive to detection of a fault in the active components for interchanging the information stored in said active and standby call stores, and means responsive to the presence of a fault in the active components after a plurality of said interchanges for inhibiting further interchanges and erasing all information from the active call store.

4. A data processing system control center in accordance with claim 1 wherein said enabling means in said maintenance center comprises a first timing circuit, means responsive to a sequence of signals from said active components during the course of the maintenance program for resetting said timing circuit and means responsive to time-out of said timing circuit for activating said transfer control circuit.

5. A data processing system control center in accordance with claim 4 wherein said enabling means in said maintenance center further comprises a second timing circuit, means responsive to the detection of a fault in said standby components for resetting said second timing circuit, and means responsive to time-out of said second timing circuit for activating said transfer control circuit.

6. A data processing system control center in accordance with claim 2 wherein said maintentnce center comprises a program store comparator for comparing the programs contained in said active and standby program stores upon interruption of the call processing operation and for restoring the formerly active control components to service upon detection of a mismatch.

7. A data processing system control center in accordance with claim 2 further comprising means for inhibiting the execution of the maintenance program contained in said standby program store.

8. A data processing system control center in accordance with claim 2 and further comprising means operative after an interchange of active and standby components for detecting a fault in a previously active component now in the standby state under control of the maintenance program contained in the program store now in the active state and means responsive to detection of said fault in said previously active component for preparing a trouble message for use by maintenance personnel.

9. In a telephone system comprising a plurality of switch units terminating distinct groups of lines and a common control center, first and second like functional control units in said control center, means for switching said first and second units between active and standby states, and common means for simultaneously testing both said units, said common means including means for automatically testing said first unit in the active state, means responsive to detection by said testing means of a fault in said active first unit for enabling said switching means, means operative thereafter for determining the operability of said second unit in the active state, and means operable concurrent with the operation of said active state testing means for automatically testing said first unit in the standby state to isolate and identify the particular element of equipment in which the fault is present.

10. In a telephone system, the combination according to claim 9 wherein said common means further comprises means responsive to detection of a fault in said active second unit in the active state for reenabling said switching means.

11. In a telephone system, the combination according to claim 9 wherein said control center further comprises means for receiving digit signals of a plurality of types from said switch units, and means for testing said receiving means comprising means for generating each of said types of digit signals and means for connecting said receiving means to said generating means.

12. In a telephone system, the combination according to claim 9 wherein said common means further comprises means for disabling said switching means and for activating only the most recently active one of said control units in response to a fault in said switching means.

13. In a telephone system, the combination according to claim 9 wherein said first and second control units each comprise a program store containing identical programs and wherein said common means further comprises means for interrupting the operation of said control units, means for comparing said programs on a word by word basis, and means for immediately discontinuing said comparison and for restoring the formerly active control unit to service upon direction of a mismatch.

References Cited

UNITED STATES PATENTS

| | | | |
|---|---|---|---|
| 3,060,273 | 10/1962 | Nowak et al. | 179—175.2 |
| 3,238,311 | 3/1966 | Alterman | 179—18.9 |
| 3,268,669 | 8/1966 | Vigliante et al. | 179—27 |
| 3,299,220 | 1/1967 | Wedmore | 179—175.2 |
| 3,302,182 | 1/1967 | Lynch et al. | 340—172.5 |
| 3,303,474 | 2/1967 | Moore et al. | 340—172.5 |

FOREIGN PATENTS

| | | |
|---|---|---|
| 1,118,273 | 11/1961 | Germany. |
| 1,118,274 | 11/1961 | Germany. |
| 954,225 | 4/1964 | Great Britain. |
| 954,226 | 4/1964 | Great Britain. |

PAUL J. HENON, *Primary Examiner.*

J. P. VANDENBURG, *Assistant Examiner.*